Feb. 5, 1935.  F. H. DONER  1,990,404
DENTAL APPLIANCE
Filed Aug. 25, 1933
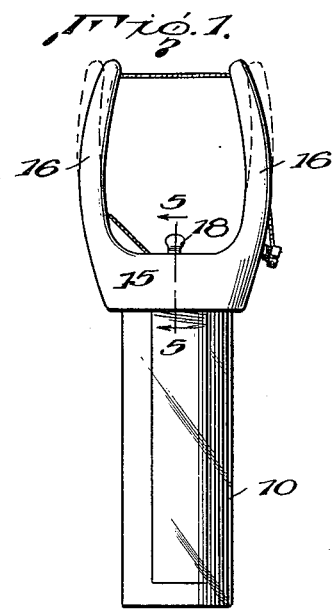
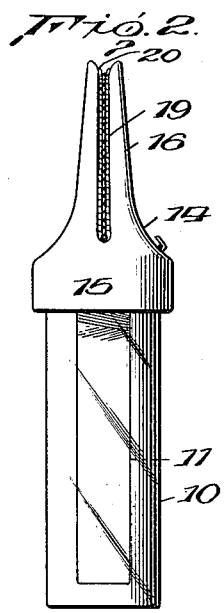
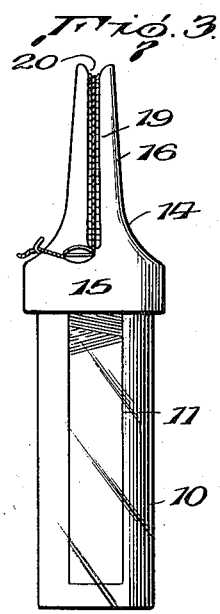
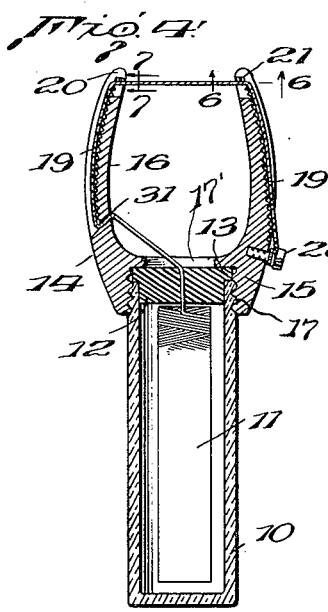
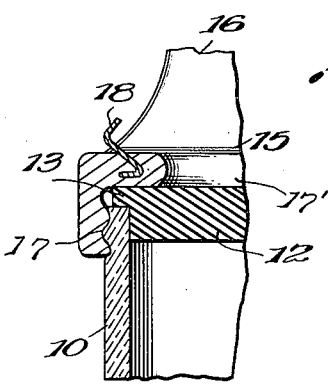
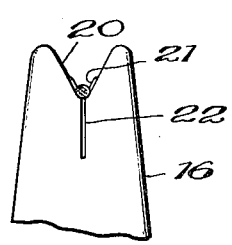
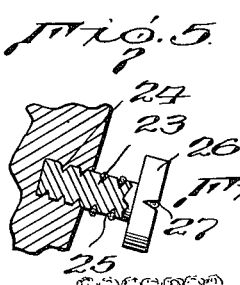
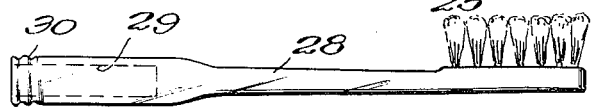
Inventor
Fred. H. Doner,
By Bernard J. Garvey
Attorney Patented Feb. 5, 1935

1,990,404

UNITED STATES PATENT OFFICE 1,990,404

DENTAL APPLIANCE

Frederick H. Doner, Watertown, N. Y.

Application August 25, 1933, Serial No. 686,798

4 Claims. (Cl. 132—92)

The present invention consists of a dental appliance which is especially adapted for use in effectively removing foods and other materials from interdental spaces and embrasures, in addition to removing soft tartar from the teeth and serving as a means to detect incipient decay, and also detect overhanging edges of dental restorations on the unexposed surfaces of the teeth.

Appliances of this character are well known in the art, but their use has been very limited, due, in some measure at least, to slippage of the dental floss under pressure when introduced into or removed from the interdental spaces: In the appliance of the present invention, the floss is tensioned and positively held from slippage while in use, thereby rendering the device effective for the purposes already set out, with the additional function of permitting a light massaging of the interdental papillæ.

Another object of the invention is to provide a dental appliance including a floss receptacle equipped with a holder constructed to support a usable length of the floss under tension, at the same time effectively resisting movement of said length while in use but permitting its severance in an expeditious manner at the option of the user.

Other objects of the invention will be apparent from the following description of the present preferred form thereof, taken in connection with the accompanying drawing, wherein Fig. 1 is an elevational view of a dental appliance constructed in accordance with the present invention, showing a length of floss in usable position thereon;

Fig. 2 is a side elevational view of the appliance looking at the fork arm through which the usable length of floss is trained;

Fig. 3 is a similar view, looking at the opposite arm which carries the anchoring means for the free end of the floss;

Fig. 4 is a vertical, sectional view of the appliance, showing to advantage how the floss is fed from the receptacle and trained through the top of the receptacle for engagement with the floss holder, the present view showing to advantage the roughened grooves of the holder arms;

Fig. 5 is a detail fragmentary, sectional view, taken on the line 5—5 of Fig. 1, looking in the direction of the arrows, showing to advantage the manner of mounting the floss cutter on the appliance;

Fig. 6 is a detail, enlarged fragmentary sectional view, taken on the line 6—6 of Fig. 4, showing to advantage the manner of mounting the floss in the bight at the free end of one of the holder arms;

Fig. 7 is a detail, enlarged fragmentary sectional view taken on the line 7—7 of Fig. 4, looking in the direction of the arrow, which shows the free end of one of the arms in side elevation, to illustrate the manner of mounting the floss therein;

Fig. 8 is a detail, enlarged fragmentary sectional view of the appliance, showing to advantage the anchoring stud or bolt, and the manner of mounting the same in the base of the floss holder; and Fig. 9 is an elevational view of a tooth brush having a receptacle at one end with which the floss holder of the present invention may be engaged.

In the drawing, a transparent receptacle 10 is shown which, in the present instance, is of cylindrical configuration merely for the purpose of illustrating the application of the invention. The receptacle is adapted to carry dental floss 11, or like material, the free end of which is adapted to be trained through a relatively thick resisting element 12, which in the present instance, consists of a rubber stopper, mounted in the open end of the receptacle and provided with an annulus 13, which overhangs the top of the receptacle, as illustrated to advantage in Fig. 5. The floss is adapted to be threaded or trained through the stopper as illustrated in Fig. 4.

The floss holder employed for supporting a usable length of the floss in desired position is generally designated 14 and consists of a circular recessed base 15, with arms 16 issuing therefrom to provide a forked structure. The wall in the recess of the base is provided with screw threads 17 complementing threads on the open end of the receptacle 10, through the medium of which the holder 14 is detachably engaged to the receptacle. It will be noted that the base of the holder 14 is provided with a central opening 17', the wall of which clamps the annulus 13 of the stopper 12 against the open end of the receptacle 10, thereby positively securing said stopper from displacement. A floss cutter 18 is mounted in any desired manner, in or on the base 15 of the floss holder. In Fig. 5 of the drawing I have shown one form of cutter mounted in said base.

Preferably the arms 16 of the floss holder are arc shape, to provide substantially convex outer surfaces in which longitudinally extending roughened grooves 19 are formed. These grooves, as illustrated to advantage in Fig. 4, extend from a point in proximity to the base 15 to the outer extremities of the arms and terminate in substantially V-shape recesses 20 at said outer extremities, as illustrated to advantage in Fig. 7. The recesses 20 are also roughened to provide teeth 21 which bite into the floss, as indicated in Fig. 6 of the drawing. Preferably I bifurcate the free ends of the arms 16 by incising the latter at the base of each recess 20, as indicated at 22. In this way, as pressure is exerted on the floss, the furcations of each arm are urged slightly apart to augment the grip or purchase on the floss in a manner more fully hereinafter described.

For the purpose of anchoring the free end of the floss, I provide a stud or bolt 23, one end 24 of which is screw threaded for engagement in the base of one of the arms 16 preferably offset from the longitudinal axis of its roughened groove 19. The shank of the stud which lies beyond the outer surface of the arm, is provided with floss engaging grooves 25, said grooves being preferably of V-shape conformation for a manifest purpose. The head 26 of the stud is enlarged and in the present instance is shown to be oval shape, the outer face thereof having a V-shape kerf 27 in which the terminal of the floss lies.

In Fig. 9 of the drawing, a tooth brush 28 of conventional design is shown, the free end of the handle of which is enlarged and recessed, as indicated at 29, for the reception of floss. Screw threads 30 are formed on the outer end of the enlarged portion of the handle, with which the floss holder 14 of the present invention may be engaged.

In use of this invention, a length of floss is adapted to be threaded or trained through the stopper 12, and opening 17' in the base 15 of the holder, as illustrated in Fig. 4. The opening in the stopper is appreciably spaced from one of the arms 16, the latter having an opening 31 therein, which is preferably disposed at an angle of approximately forty-five degrees, providing abrupt shoulders at both ends of the opening which are impinged by the length of floss passing through said opening. Said length of floss is then trained through the roughened groove 19 of said arm, and drawn across the free ends of both arms in the recesses 20 of said arms and is continued through the roughened slot or groove 19 of the opposite arm, being finally engaged with the grooves 25 of the stud 23 and the kerf 27, of the head of the stud. The free ends of the arms 16 are sufficiently flexible to permit relative movement thereof. I preferably exert pressure on the free ends of the arms to relatively move the latter while the floss is being engaged therewith. In this way, the floss is drawn taut, so the portion spanning the distance between the arms will be tensioned when the free end of the floss is anchored on the stud 23. It is therefore apparent that a resistance on the floss is set up from the point the latter enters the opening 31 completely around both arms to the anchoring stud 23. Furthermore, by providing the incisions 22 in the arms, the furcations at the outer end of each arm will flex slightly to increase the resistance. In this manner the usable length of the floss is positively held from slipping. As is well known in the art, in using devices of this character, the receptacle 10 is employed as a handle and the portion of the floss which spans the distance between the arms of the floss holder is urged into the interdental spaces, while the arms straddle the teeth. After the usable length of the floss has served its purpose, it may be severed by the cutter 18 in an obvious manner.

The device of my invention provides a moisture-proof joint or connection between the floss receptacle and floss holder appliance by use of the stopper 12 and manner of mounting the same between the receptacle and appliance. Consequently seepage of moisture, from the mouth of the user into the receptacle, is prevented. Furthermore, the floss holder appliance of this invention may be removed and cleaned without affecting the unused floss in the receptacle. A refill for the present invention consists of a spool of floss threaded through a stopper and merchandised in cellophane, or the like.

It is to be understood that various changes may be made in my invention, especially in the details of construction; proportion and arrangement of parts, within the scope of the appended claims.

What is claimed is:

1. A dental floss support for floss carrying receptacles including a fork for engagement with the receptacle, the floss engaging surfaces of which are convex and provided with roughened grooves which receive the floss, the free terminal of each fork having a recess therein which issues into an incision providing furcations which flex when pressure is exerted on the floss.

2. A dental appliance including a floss holding receptacle equipped with a relatively thick elastic stopper through which the floss is adapted to be drawn from the receptacle, a portion of said stopper being extended to overlap the open end of the receptacle, and a floss holder mounted on the receptacle and engaged with the extended portion of the stopper to clamp the latter into moisture-tight engagement with the receptacle, said holder including arms for sustaining a portion of the floss in usable position.

3. A dental appliance including a floss carrying receptacle, a holder for supporting a usable length of the floss including arms, the outer surfaces of which are provided with roughened grooves for the reception of portions of the length of floss, and a stud detachably mounted in one of said arms and provided with grooves in its shank and head for the reception of the free end of the floss.

4. A holder for dental floss including a base with arms issuing therefrom the outer surfaces of which are provided with roughened grooves for the reception of the floss, one of said arms having an inclined opening at the base of its groove at a point remote from the receptacle to provide abrupt shoulders against which the floss impinges, and means on the opposite arm offset from the groove of the latter in which the free end of the floss is secured.

FREDERICK H. DONER.